United States Patent
Löffler et al.

(10) Patent No.: US 6,553,762 B2
(45) Date of Patent: Apr. 29, 2003

(54) EXHAUST GAS TURBOCHARGER FOR AN INTERNAL COMBUSTION ENGINE

(75) Inventors: Paul Löffler, Stuttgart (DE); Wolfgang Erdmann, Stuttgart (DE); Peter Fledersbacher, Stuttgart (DE); Siegfried Sumser, Stuttgart (DE); Friedrich Wirbeleit, Esslingen (DE); Jürgen Willand, Stuttgart (DE)

(73) Assignee: DaimlerChrysler A.G., Stuttgart (DE)

( * ) Notice: Subject to any disclaimer, the term of this patent is extended or adjusted under 35 U.S.C. 154(b) by 0 days.

(21) Appl. No.: 10/021,686

(22) Filed: Dec. 11, 2001

(65) Prior Publication Data
US 2002/0085932 A1 Jul. 4, 2002

(30) Foreign Application Priority Data
Dec. 12, 2000 (DE) .......................................... 100 61 846

(51) Int. Cl.⁷ ................................................ F02B 33/44
(52) U.S. Cl. ....................... 60/605.1; 415/203; 415/204
(58) Field of Search .................................. 415/177–178, 415/205, 203, 204, 175; 417/406, 407, 408, 409; 60/605.1, 606

(56) References Cited

U.S. PATENT DOCUMENTS

| 4,147,467 A | * | 4/1979 | Leicht et al. ................ 415/196 |
| 5,087,176 A | * | 2/1992 | Wieland ..................... 417/407 |
| 5,152,666 A | * | 10/1992 | Stripinis et al. ............. 415/178 |

FOREIGN PATENT DOCUMENTS

DE 28 43 202 4/1980

* cited by examiner

Primary Examiner—Sheldon Richter
(74) Attorney, Agent, or Firm—Klaus J. Bach

(57) ABSTRACT

In an exhaust gas turbocharger for an internal combustion engine including an exhaust gas turbine and a compressor connected to the turbine so as to be operated thereby, the turbine includes a housing consisting of an inner and an outer shell formed from steel sheets and being arranged in spaced relationship so as to form therebetween an intermediate space.

12 Claims, 3 Drawing Sheets

EXHAUST GAS TURBOCHARGER FOR AN INTERNAL COMBUSTION ENGINE

BACKGROUND OF THE INVENTION

The invention relates to an exhaust gas turbocharger for an internal combustion engine including an exhaust gas turbine and a compressor driven by the exhaust gas turbine, wherein the turbine comprises a turbine housing with a turbine wheel rotatably supported in the turbine housing.

DE 28 43 202 discloses an exhaust gas turbocharger which includes an exhaust gas turbine driven by the exhaust gases of an internal combustion engine and a compressor, which is coupled to the turbine by a shaft for rotation with the turbine and which compresses inducted combustion air to a charge pressure with which the combustion air is supplied to the cylinder inlets of the internal combustion engine. The housing of the exhaust gas turbocharger consists of three individual housings for the turbine, for the compressor and for the bearing between the turbine and the compressor. Each individual housing is formed as a casting wherein the housing for the turbine and the compressor, which are arranged at opposite sides of the bearing housing, include also the supply and the discharge passages for the turbine and, respectively, the compressor.

The housings, which are manufactured by casting, can be produced inexpensively and they also provide for the necessary safety if the turbine or the compressor wheel should burst. They are however heavy, particularly for utility vehicle applications because they are relatively large, and they require expensive and complicated connecting and support elements for their support in the vehicle. In addition, those high-mass housing have the disadvantage that, because of their high heat capacity, a large amount of heat is stored in the walls of the housings. As a result, a relatively large amount of heat is removed from the exhaust gas supplied to the turbine, whereby the energy supplied to the turbine wheel is reduced which results in power losses particularly after a cold start of the engine.

On the other hand, there is the problem that, after shut down of the engine, the heat stored in the housing, particularly in the area of the turbocharger, may lead to coking of the oil in the charger. The high temperatures may further result in thermal stresses in the housing. In order to avoid excessively high thermal stresses, the housings must be provided with complicated cooling systems whereby the already large weight is further increased.

Another disadvantage resides in the fact that, because of the removal of heat from the exhaust gas, the catalytic converter is insufficiently heated particularly at the beginning of the engine operation so that the catalytic converter becomes fully effective only with a certain time delay.

It is the object of the present invention to provide a turbocharger, which is of a simple design but has a high efficiency. It should also have a relatively low weight.

SUMMARY OF THE INVENTION

In an exhaust gas turbocharger for an internal combustion engine including an exhaust gas turbine and a compressor connected to the turbine so as to be operated thereby, the turbine includes a housing consisting of an inner and an outer shell formed from steel sheets arranged in spaced relationship so as to form therebetween an intermediate.

A coolant may be conducted through the space between the sheet metal shells. The two metal shells, which delimit particularly a spiral passage for guiding the exhaust gas to the turbine wheel, are—compared with the cast components of the state of the art—relatively lightweight since the relatively thin sheet metal walls are substantially lighter than the cast walls. Inspite of the small wall thickness, they have a high burst resistance. Another advantage is the low heat storage capacity of the double wall of sheet metal whereby the thermal efficiency of the turbocharger and also the start-up behavior of the catalytic converter of the respective engine are improved. There is no need for providing the heat shield panels by means of which the radiation heat has been contained in the past.

In a particular embodiment, the inner and outer sheet metal shells consist of sheet steel wherein the outer sheet consists of temperature resistant material and the inner sheet consists of a high-temperature resistant material. The inner metal shell is in direct contact with the hot exhaust gas and is therefore heated to a greater degree than the outer metal shell, which is not contacted by the hot exhaust gas. The inner shell, which delimits the spiral inlet passage and which consists of a highly temperature resistant material is selected so that it is resistant to the high exhaust gas temperatures. The outer shell, which extends around the inner shell, however is not in contact with the exhaust gas so that it can be made of a material with lower temperature resistance than that of which the inner shell is made.

The inner shell as well as the outer shell can be shaped parts formed by suitable deformation techniques, such as internal high-pressure shaping procedures, from planar metal sheets. They may have complex shapes to form for example the spiral gas inlet channel of the turbine. It is also possible to form a spiral inlet with two inlet passages from a single inner shell, the two passages of the spiral channel being separated by a divider wall, which is formed by an appropriate shaping of the inner shell.

The inner and the outer shells are preferably constructed so as to be separated from the exhaust channel of the turbine wherein the turbine wheel is supported. The exhaust channel which, at the opposite side of the turbine wheel, may be connected with a bearing housing is preferably a casting which is capable of withstanding the static and dynamic forces of the turbine wheel and which is capable of maintaining its original shape and dimensions. The inner and the outer shells are separate from the outlet channel and are therefore not subjected to the high forces effective on the turbine wheel. The heat generated by the turbine wheel is generally taken up and conducted out by way by the exhaust channel so that the inner and outer shell remain to a large degree unaffected by the heat generated by the turbine wheel.

The intermediate space between the inner and the outer shells may accommodate a coolant, which, in a preferred embodiment, is admitted by way of inlet nozzles and discharged by way of outlet nozzles. In another embodiment, the turbine housing, which consists of inner and outer shells, may form a single component with an exhaust manifold, which is mounted to the cylinder outlet of the internal combustion engine.

The invention will become more readily apparent from the following description of particular embodiments thereof on the basis of the accompanying drawings.

DESCRIPTION OF PREFERRED EMBODIMENTS

Figure 1:
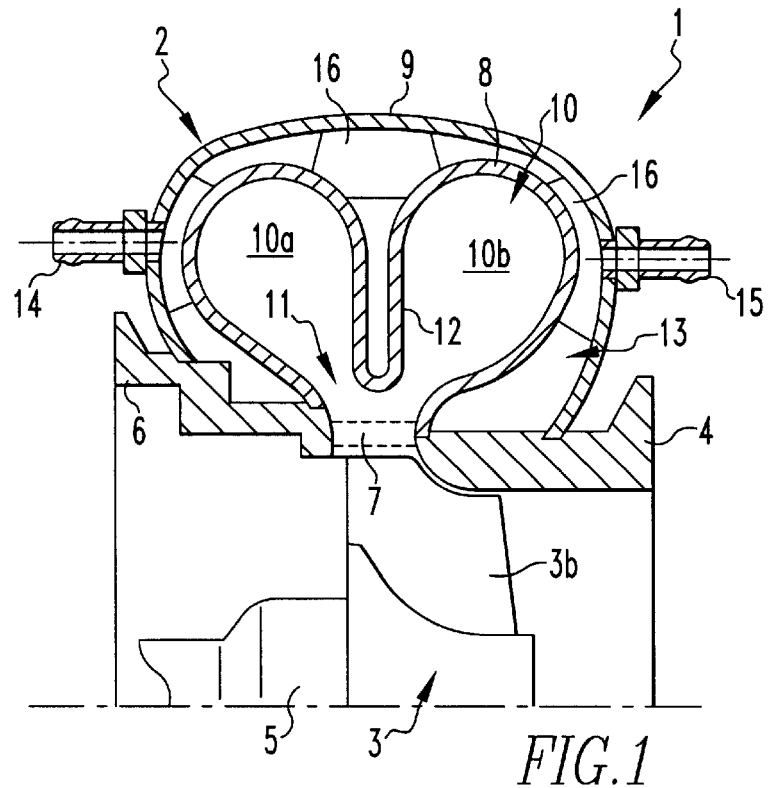
FIG. 1 is a cross-sectional view of a turbine housing with a two-channel spiral inlet structure.

In the figures, identical parts are designated by the same reference numerals.

As shown in FIG. 1, the exhaust gas turbine of an exhaust gas turbocharger of an internal combustion engine which may be a gasoline engine or a Diesel engine and which may be installed in a passenger car or a utility vehicle, comprises a turbine housing 2 and a turbine wheel 3 onto which the exhaust gas of the internal combustion engine is conducted so that the turbine wheel is rotated thereby. The turbine wheel 3 is rotatably supported in an exhaust channel 4 of the exhaust gas turbine and is connected to a shaft 5 for rotation therewith. The rotation of the turbine wheel 3 is transmitted, by way of the shaft 5, to the impeller of the compressor of the exhaust gas turbocharger for compressing the intake air. The exhaust channel 4 is connected to a bearing housing 6 by means of connecting elements 7. The exhaust channel 4 and the bearing housing 6 are disposed at opposite sides of the turbine wheel 3. The turbine housing 2 is of a double-wall design and comprises an inner shell 8 and a spaced outer shell 9, which together form a spiral turbine inlet channel 10. In the embodiment as shown in FIG. 1, the inlet channel 10 includes two inlet passages, that is, a first inlet passage 10a and a second inlet passage 10b. Exhaust gas from the cylinder exhaust of the internal combustion engine is supplied to the turbine wheel 3 by way of an inlet area 11 from the spiral channel 10 and is then conducted, by way of the exhaust channel 4, to a downstream catalytic converter. The two inlet passages 10a and 10b are separated from each other inside the spiral channel 10 by a divider wall 12, which is formed integrally with the inner shell 8. The plane of the divider wall 12 intersects the inlet area 11. In the example as shown in FIG. 1, the divider wall 12 however does not extend into the inlet area 11. Rather, near the inlet area 11, the two flow passages 10a and 10b are joined to permit a gas exchange between the two flow passages.

The inner shell 8 and the outer shell 9 of the turbine housing 2 are spaced from each other and form an intermediate space 13 through which advantageously a coolant can be conducted. The coolant is introduced by way of an inlet nozzle 14 and is discharged by way of an outlet nozzle 15, which are both arranged in the outer shell 9. In the intermediate space 13, between the inner shell 8 and the outer shell 9, there are provided support ribs 16 by which the inner and outer shells 8 and 9 are supported with respect to each other. The support ribs 16 act also as reinforcement ribs to make the turbine housing 2 more rigid and to improve its overall strength.

The inner shell 8 and the outer shell 9 consist of sheet metal, especially of sheet steel and can be manufactured by a mechanical deforming process. The divider wall 12 separating the two inlet flow passages 10a and 10b is formed integrally with the wall of the inner shell 8, whereby the inner shell 8 has a closely heart-shaped cross-section. The outer shell 9 surrounds the inner shell without projections or recesses in its contour. The inner shell 8 consists preferably of a highly temperature resistant sheet steel; the outer shell 9 is not exposed directly to the high exhaust gas temperatures and consists therefore only of a temperature resistant sheet steel.

The inner shell 8 and the outer shell 9 are manufactured as individual components separate from the exhaust channel 4 and the bearing housing 6. When assembled, the inner shell 8 and the outer shell 9 radially surround the inlet area 11 between the exhaust gas outlet channel 4 and the bearing housing 6 by way of which the exhaust gas flows from the inlet flow passages 10a and 10b onto the blades 3b of the turbine wheel 3. The connecting element 7 disposed in the inlet area 11 between the exhaust channel 4 and the bearing housing 6 may be in the form of a flow guide structure by which a desired momentum is imparted to the exhaust gas which is directed onto the turbine wheel 3. The connecting element 7 may be part of a variable turbine inlet geometry for the variable adjustment of the inlet flow cross-section to the turbine wheel 3.

The exhaust channel 4 and the bearing housing 6 are preferably castings. The inner shell 8, which is disposed on the outside of the exhaust channel 4, and the bearing housing 6 are preferably gas- and pressure-tight in order to avoid flow and pressure losses.

Figure 2:
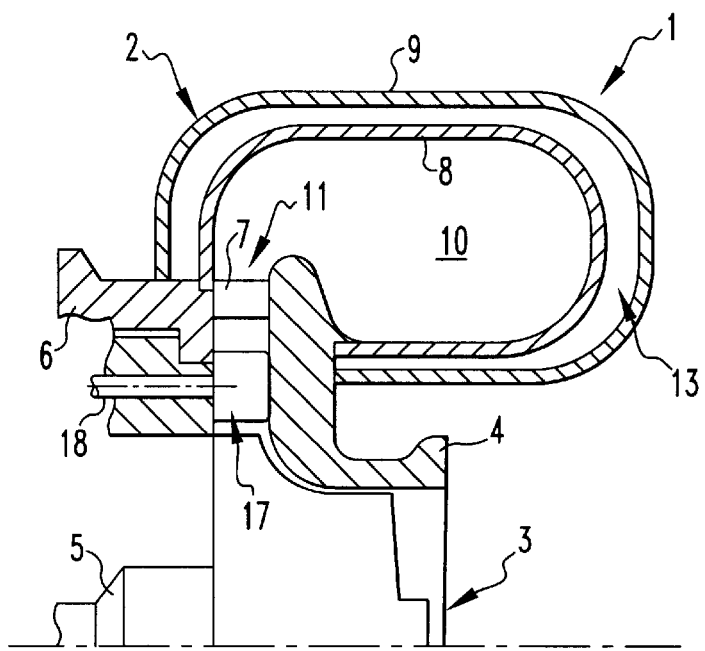
FIG. 2 is a cross-sectional view of a turbine housing with a single-channel spiral inlet structure.

In the embodiment of FIG. 2, the exhaust gas turbine 1 includes a spiral inlet channel 10 with a single inlet flow passage, which is in communication, by way of the inlet area 11, with the exhaust channel 4 and the turbine wheel disposed therein. The connecting element 7 is preferably in the form of a stationary guide structure. In addition, a variable turbine geometry 17 may be disposed in the turbine inlet area 11 for example in the form of a guide vane structure with variable vanes, which can be moved by a control element 18 between a closed position in, which the flow cross-section of the inlet area is minimized, and an open position, in which the exhaust gas flow through the turbine in unrestricted.

Figure 3:
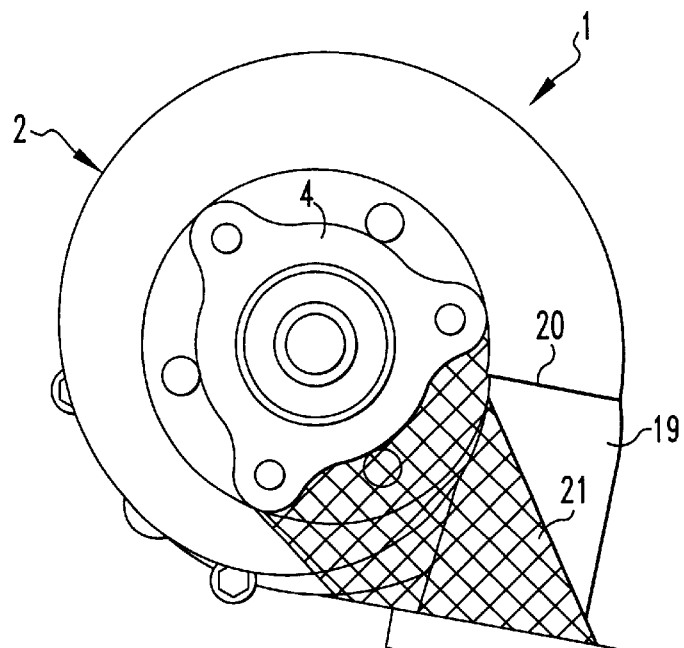
FIG. 3 is a side view of the exhaust gas turbine housing according to FIG. 2.
Figure 4:
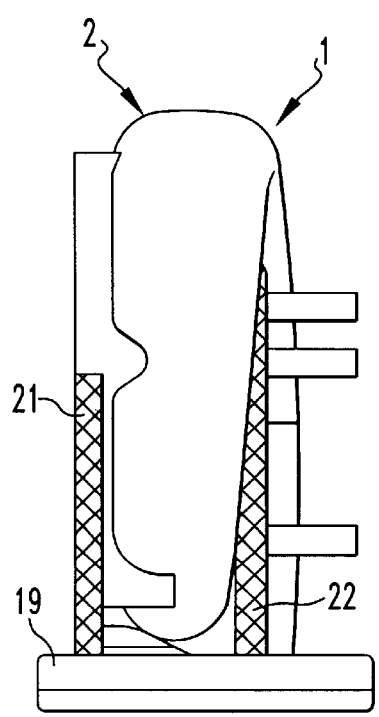
FIG. 4 is a front view of the exhaust gas turbine housing of FIG. 2.
Figure 5:
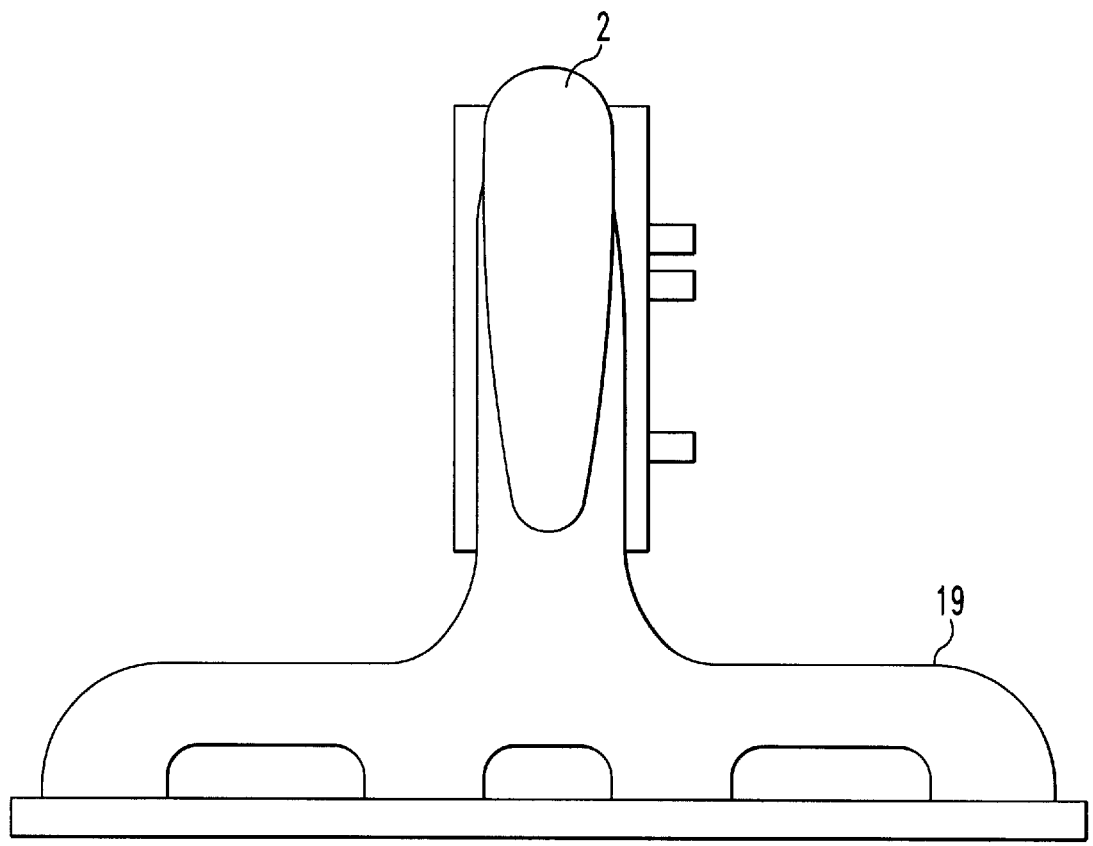
FIG. 5 is a top view of the exhaust gas turbine of FIG. 2 formed integrally with an exhaust manifold of an engine.

From the representations of FIGS. 3 and 4 and 5, it is apparent that the turbine housing 2 is connected to an exhaust gas manifold 19 wherein an expansion-accommodating element 20 (FIG. 3) may be provided for the interconnection. The turbine housing 2 is connected to the exhaust channel 4 and the bearing housing by struts 21 and 22.

FIG. 5 shows an arrangement wherein the turbine housing 2 is formed integrally with the exhaust manifold 19.

What is claimed is:

1. An exhaust gas turbocharger for an internal combustion engine comprising: an exhaust gas turbine and a compressor connected to said exhaust gas turbine so as to be driven by the turbine, said exhaust gas turbine including a turbine housing, said turbine housing consisting of two spaced structures of sheet metal, one forming an inner shell and the other forming an outer shell surrounding said inner shell in spaced relationship so as to form an intermediate space between said inner and outer shells.

2. An exhaust gas turbocharger according to claim 1, wherein said inner and said outer shells are formed from steel sheets.

3. An exhaust gas turbocharger according to claim 2, wherein said outer shell is formed from a temperature-resistant steel.

4. An exhaust gas turbocharger according to claim 3, wherein said inner shell is formed from high-temperature resistant sheet steel, which has a higher temperature resistance than the sheet steel from which said outer shell is formed.

5. An exhaust gas turbocharger according to claim 1, wherein said inner shell and said outer shell are shape-pressed from metal sheets.

6. An exhaust gas turbocharger according to claim 1, wherein said inner shell defines a turbine inlet with two inlet flow passages, which are formed by an inwardly extending divider wall portion of said inner shell for dividing the spiral inlet channel of said turbine into said two flow passages.

7. An exhaust gas turbocharger according to claim 1, wherein said inner shell forms a single spiral inlet flow passage for directing exhaust gas to said turbine wheel.

8. An exhaust gas turbocharger according to claim 1, wherein said outer shell includes an inlet nozzle for supplying a coolant to the intermediate space between said inner and outer shells and an outlet nozzle for discharging the coolant from said intermediate space.

9. An exhaust gas turbocharger according to claim 1, wherein said turbine includes an exhaust channel and said turbine wheel is disposed in said exhaust channel, said exhaust channel, said inner shell and said outer shell being separate components.

10. An exhaust gas turbocharger according to claim 9, wherein said exhaust channel is a casting.

11. An exhaust gas turbocharger according to claim 1, wherein said inner shell and said outer shell form a turbine housing which forms an integral component with the exhaust manifold connected to cylinder exhaust gas outlets of an internal combustion engine.

12. An exhaust gas turbocharger according to claim 1, wherein support ribs are provided in the intermediate space between said inner and said outer shells for supporting said inner and said outer shells relative to each other.

\* \* \* \* \*